UNITED STATES PATENT OFFICE.

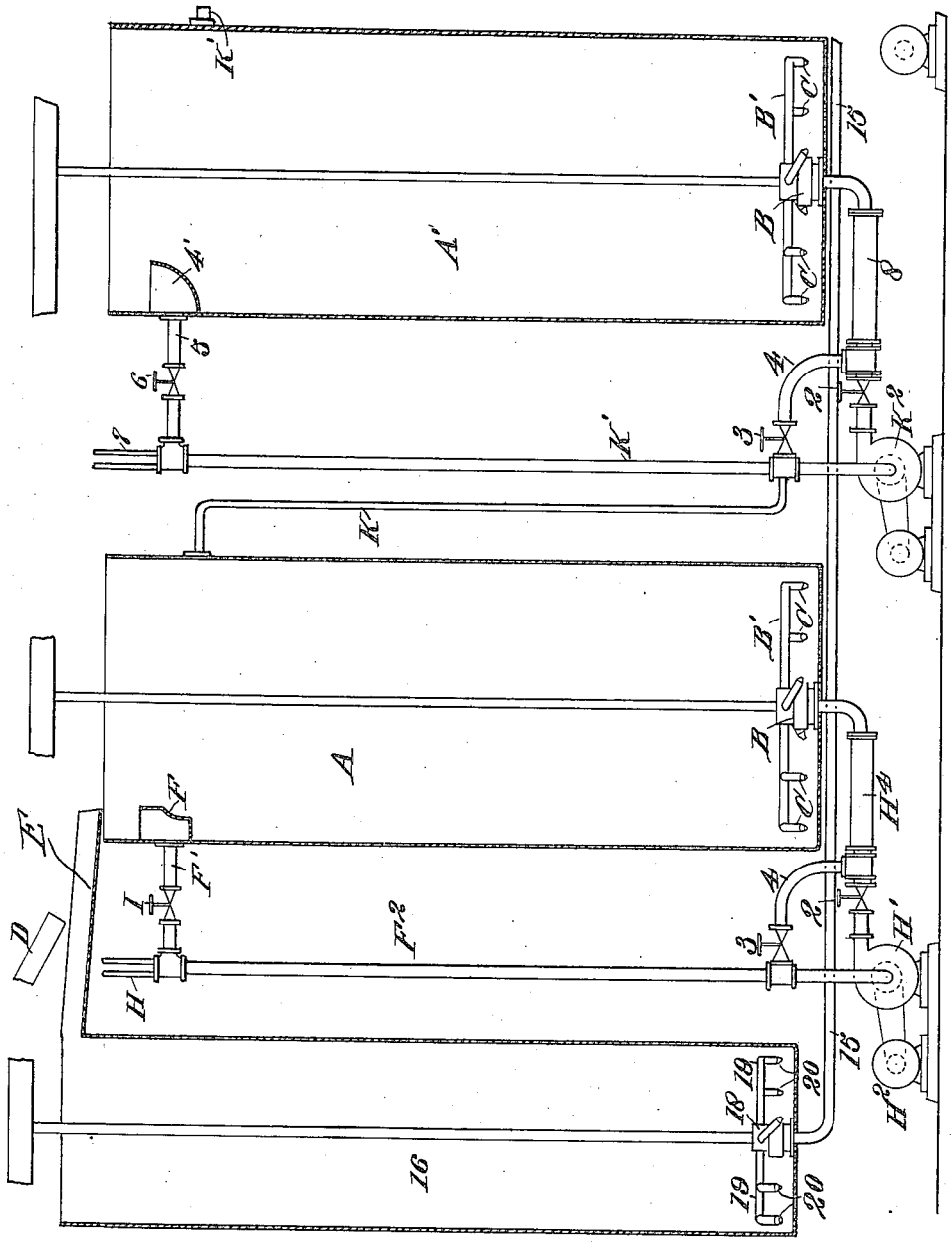

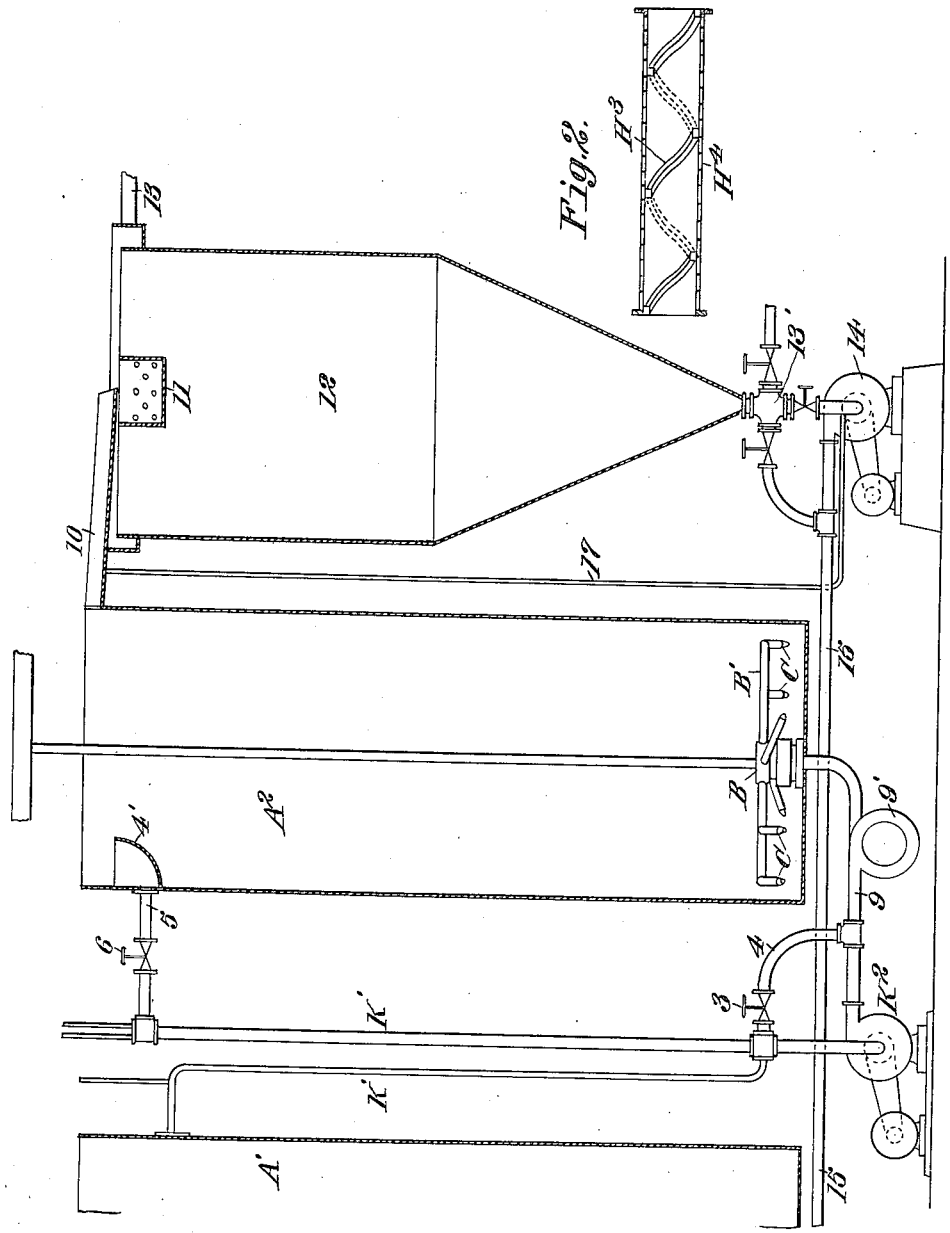

LAMARTINE C. TRENT, OF LOS ANGELES, CALIFORNIA.

CONTINUOUS METHOD FOR THE PURIFICATION OF SEWAGE.

1,394,698. Specification of Letters Patent. Patented Oct. 25, 1921.

Original application filed March 26, 1919, Serial No. 285,286. Divided and this application filed February 14, 1921. Serial No. 444,628.

*To all whom it may concern:*

Be it known that I, LAMARTINE C. TRENT, citizen of the United States, residing in the city and county of Los Angeles and State of California, have invented certain new and useful Improvements in Continuous Methods for the Purification of Sewage, of which the following is a specification.

In the carrying out of the method invention for the purification of sewage or other waste liquors deleterious to health, the essential feature to be borne in mind is the necessity for the withdrawal of the sewage accumulated within a suitable primary storage vessel from adjacent the upper surface thereof and returning the same to within the said container or vessel at the bottom thereof, and during the withdrawal and returning of the original solution to said vessel inducing within or with the flowing stream a given or suitable quantity of air, causing the intermingling of the air with the solution at a point outside the primary receiving tank by a rapid circulation of the liquid so as to cause the air to break and dissolve within the solution to as great a degree as possible prior to the reintroduction of the solution with the dissolved air therein to within the said primary receiving tank or vessel.

Various methods have been designed for the purification of the sewage waste of a city, some being of the intermittent or alternating charge system and others being on the lines of continuous systems, or rather continuous treatment of the solution, but, so far as I am aware, no system has heretofore been developed wherein the sewage to be treated is withdrawn from within an initial receiving tank or vessel from the upper portion thereof and returned under pressure and rapid circulation through the bottom thereof and discharged into the said vessel from a rotating distributer, which not only serves to cause the liquid to apply as jet streams onto the bottom of the tank to maintain the same clear or free from accumulations or sedimentation, but further serves the purpose of causing or creating agitation of the solution at or adjacent the bottom of the tank, the withdrawn solution having introduced therein air during the circulation and return thereof to the tank after having passed through a rotary pump for causing the aeration of the liquid and the dissolving of the air therein. Inasmuch as there must be not arresting or period of settlement of the solution throughout the circulating action for the purification of the liquid, it will be understood that the thickened activated sludge or solids settled out of the liquid must be returned either to the primary tank or vessel or to an outside vessel for delivery to the primary tank or vessel, and this must be carried on without permitting the solids to linger or become quiescent, for, if such is permitted, the same becomes septic, and in order to maintain the necessary bacterial life for the carrying out of the process, there should be injected into the thickened or activated sludge a quantity of air for intermixing therewith during the course of its travel from the thickening or sedimentation vessel to the primary receiving vessel.

In brief, the method invention resides in the treating of the sewage liquid within successive receiving vessels connected one with the other in sequence and the withdrawal of the liquid from the top portion of the first vessel of the series and returning the same into the second vessel of the series through the bottom thereof and similarly transferring the liquid from the first to the second vessel of the series and from the second to the third and from the third to the sedimentation vessel, during each withdrawal of the liquid for transferring from one vessel to another there is admitted into the withdrawn solution, minute jet streams of air, which are intermingled with the liquid and is dissolved therein, the transference from and circulation of the liquid from the top to the bottom of each vessel being at a high rate of flow, or, in other words, into rapid circulation, and during the course of which circulation the indrawn air is dissolved within the liquid under treatment for purification, the solids contained within the solution being gradually increased as the solution is carried from one vessel to the other, and the liquid brought to a state of rest in a quiescent condition within the sedimentation tank to enable an accumulation of the solids or sludge within said vessel, which activated sludge is transferred to an aerating sludge vessel for transference therefrom to the primary vessel of the series of connected agitating and aerating vessels; the rapid circulation of the liquid under treatment between the aerating vessels being at a rate of speed far in excess of the flow stream of the liquid into the primary or receiving vessel of the series, and the normal outflow from said vessel for delivery into a successive vessel of the series.

Any suitably constructed form of an apparatus may be employed for the carrying out of the method invention, the essential requirement thereof being that there shall be a plurality of connected receiving or treating vessels or containers, and in its preferred embodiment, disclosed in my co-pending application Serial No. 285,286, filed March 26th, 1919, of which the present application is a division, there is employed a series of such vessels through which the material under treatment is successively passed prior to the delivery thereof into what I shall term, for the time being, a thickening or sedimentation vessel.

To comprehend the method invention, reference should be had to the annexed sheet of drawings wherein:—

Figures 1 and 1$^a$ are longitudinal sectional views of the entire apparatus.

Fig. 2 is a detail sectional view of one of the connections interposed between the suction pumps and certain of the receiving and aerating vessels.

In the drawings, the letters A, A$^1$ and A$^2$ represent a series of connected aerating tanks or vessels, or that designated by the reference letter A constitutes what I shall term the primary receiving vessel, or the one into which the original liquid to be treated is delivered from a suitable source of supply. Each tank is the same as to construction and capacity, and are preferably of such size as to hold at least a minimum quantity of six thousand (6,000) gallons and to this quantity holding each tank should be approximately fifteen feet in height by six feet in diameter, although it will be understood that the size of the tanks or vessels will vary in accordance with the amount of liquid to be treated. These vessels which are arranged in multiple series serve as aerating tanks, and within each thereof is supported on suitable bearings, adjacent the bottom thereof, a hollow rotary distributer-head B, each head being provided with a series of radially disposed hollow arms B', and each arm in turn carrying a series of tangentially disposed jet nozzles C through which the material passing through the distributer head B and arms B' is ejected onto the bottom surface of the tank as divided jet streams under pressure.

The sewage liquor to be treated is discharged into the primary tank A, at the upper end thereof from a conduit, sluice or influent pipe D, which communicates with and delivers into the branch influent conduit E for the discharge of the liquid to be treated into the vessel A at the top thereof. The liquid is permitted to flow into the said primary vessel A, until the same is filled to the point of overflowing into the hopper or receiver F. With this hopper or receiver F communicates a withdrawal pipe F' which connects with the downwardly extending branch F$^2$, forming the suction pipe for the pump hereinafter referred to. Above the connection or union with the pipe F$^2$ extends the multiple air inlet pipes H, so that with the downflow of the liquid drawn into the pipe F$^2$ through the connection F with the upper end of the vessel H there is drawn into the said pipe by suction a quantity of air. At its lower end, the pipe F$^2$ communicates with a rotary suction pump H', which is driven at high speed by a suitable motor H$^2$. During the flow of the liquid through the said pump, it is subjected to high friction and the air drawn in or admitted into the flowing solution as drawn into the pipe F$^2$ is thoroughly intermixed with the said solution and dissolved therein, being discharged from the suction pump into the head B within the container or vessel A through the connecting pipe H$^4$.

As well known, during the flow of a stream of liquid with air intermixed therewith, the tendency of the air is to hug the upper surface of the pipe or conduit through which it flows, and in order to prevent this and maintain the air in thoroughly intermixed atomized condition, there is arranged within the pipe section H$^4$ a fixed spiral H$^3$, Fig. 2 of the drawings, so that to the liquid forced under pressure through the pipe section H$^4$ there is given a spiral twist or whirl and the air contained therein is prevented from escaping and hugging the upper wall surface of the said pipe connection. The pressure of the stream liquid entering the distributer head B forces the liquid into the radial arms B' and imparts rotation to the said head, the liquid being ejected from the nozzles C as jet streams under pressure which impinge against the upper surface of the bottom wall of the container or vessel A so as to sweep and maintain the same free of sedimentation, which is essential in the handling of liquor of this character. Where the inflow of the liquid to be treated into the primary tank A is approximately at the rate of 35 gallons per minute, the withdrawal thereof through the pipe connections F' and F$^2$ and the return into the vessel through the bottom thereof is at such an increased rate of speed as to give a circulation of approximately two hundred and twenty-five (225) gallons per minute, so that there is a rapid circulation of the air impregnated liquid over the inflow within the tank of the original liquid. From the tank A, adjacent its upper end, but at a level lower than the overflow into the receptacle or compartment F, there extends the outlet pipe K which leads downwardly and communicates with the suction pipe K' of the second vessel A' of the series and at a point adjacent the connection thereof with a rotary pump K². It will be understood the flow of the liquid from the primary tank into the suction pipe F² is regulated by a hand-controlled valve 1 and that the flow of the liquid from the pump H' through the connection H² with the bottom of the said vessel may be regulated by the hand-controlled valve 2, and in case it is desired to return a portion of the flowing aerated solution to the suction pipe F², the same may be accomplished by opening the hand valve 3 of the by-pass 4.

The second vessel A' of the series of connected vessels is provided adjacent its upper end with an overflow hopper 4' into which the liquid forced into the tank or vessel A' through the bottom thereof overflows when the said tank has been filled to a level slightly below its upper end. With this overflow communicates the branch connection 5 which connects the suction pipe K' with the said hopper 4', the flow through which connection 5 is controlled by the hand regulated valve 6. Like the suction pipe F², the suction pipe K' at a point above its connection or union with the branch 5 is provided with a series of upwardly extended air inlets 7, so that on the suction flow of liquid from within the vessel A' through the branch 5 and the suction pipe K' there is drawn into the said pipe streams of air through the inlets 7, which intermixes with the flowing stream and said intermixed stream of liquid and air being drawn into the pump K² together with the liquid passing through the pipe K from the primary vessel or container A. The liquid as circulated within the pump K² has thoroughly intermixed and dissolved therein the air drawn into the suction pipe K' with the suction flow of the liquid from the vessel A¹ and is returned into the vessel A¹ through the pipe connection 8 which in construction is similar to that of the connection H⁴ of the primary tank or vessel A. Within the vessel A¹, and adjacent the bottom thereof, is mounted for free rotation a head, distributing arms and jet nozzle conforming to those within the vessel A and similarly identified. It is to be understood that the circulation of the liquid through the suction pipe K¹, pump K² and connection 8 is at the same rate of speed as that which takes place through the suction pipe F². The connection between the vessel A¹ and vessel A² is the same as between A and A¹ and the withdrawal connection and the inlets for the admission of air into the withdrawn liquid is the same and, equally so, the pump and its connection with the rotating head within said vessel, and which head with its arms and nozzles is the same as the ones located within the vessels A and A¹. The connection between suction pump controlling the suction of liquid and air and the intermixing of air and liquid prior to discharge into the vessel A² differs slightly from the form illustrated in connection with vessels A and A¹, for, in this case, the connection 9 is formed intermediate of its length with an involute section 9' which is merely illustrated for the purpose of indicating that a different type of means for maintaining the air intermixed with the liquid may be utilized in lieu of the means employed in connection with vessels A and A¹. The overflow of liquid from tank A² is led through means of a conduit 10 into a diffuser 11 situated within a settling vessel 12 and within which vessel the solids carried by the liquid settle to the bottom thereof, the clear liquid rising to the top and escaping from within the settling or sedimentation vessel 12 through the outlet 13. The settling vessel or tank 12 is provided with a valve-controlled outlet 13' which communicates with a rotary pump 14, and by means of which the withdrawn, thickened and activated sludge is forced through the pipe connection 15 to a sludge aerating tank 16, in the present case arranged in advance of the primary vessel A. In order to provide against the thickened sludge withdrawn from the tank 12 and forced into the sludge aerating tank 16 from becoming septic, there is provided an air inlet pipe 17 which admits the requisite air or oxygen to be supplied to the activated sludge as drawn into the pump 14. The flowing stream of activated or thickened sludge is admitted into the aerating sludge tank 16 through the rotary head 18 of a distributer located within said tank, the said sludge being forced from the head 18 into the radial arms 19 of the distributer and flowing therefrom through the tangentially disposed nozzles 20. The pressure of the thickened solution forced through and ejecting from the arms 19 imparts rotation to the said distributer. As the tank 16 becomes filled, the aerated sludge is discharged into the conduit E which conveys the same to the hopper or receptacle F, of the primary tank A.

It will thus be noted that the method of treatment is a continuous one and that the air requisite for intermixing and dissolving with the solution under treatment is supplied thereto at the time the same is admitted into the suction pumps, before referred to, for controlling the circulation of the liquids to be purified, while at the same time, the tendency of the flowing body of activated sludge to become septic is prevented by the admission of air thereto as the same is withdrawn by the suction pump for forcing into the sludge aerating tank.

The activated sludge transferred from the sedimentation tank or vessel 12 to and into the aerating tank or vessel 16, is thoroughly aerated and oxygenated for rendering more active the thickened sludge and providing or maintaining the bacterial life required for introduction into the waste sewage delivered into the primary receiving and aerating tank or vessel, the said aerated active or thickened sludge being necessary for introduction into the waste sewage for enabling the process of purification to be successfully carried out.

The essential steps of the method invention reside in the introduction of air into the liquid withdrawn from the upper portion of the aerating tanks for return through the bottom thereof and dissolving the air so introduced into the withdrawn liquid by rapid circulation through the action of the rotary suction pumps for frictionally heating the liquid and returning the same under pressure into the vessel from which withdrawn; the maintaining of the liquid under agitation within the aerating vessels, the settlement of the final discharged liquid for collecting and accumulating the solids contained therein for the production of activated sludge; the delivery of the activated sludge to an aerating receiving sludge vessel while admitting air to said flowing stream, and finally the discharge of the aerated built up activated sludge from said vessel into the primary receiving vessel of the series of treating vessels.

What has heretofore been referred to as aerating vessels connected in series, are more properly aerating and oxidation vessels, the final one of which is connected for discharge into the sedimentation vessel 12, and from the foregoing description of the invention it will be apparent that oxygen is not only admitted into the sewage during the course of its flow from one vessel into another, but equally so oxygen is admitted into the thickened sludge while being transferred from the sedimentation vessel to the sludge aerating or oxidation vessel.

The connection between the upper portion of each oxidation vessel and the bottom portion thereof constitute an exterior by-pass, through which the liquid is rapidly circulated and oxidized by the air admitted into the by-pass connection within one portion of the path of travel of the liquid moving therethrough.

Having thus described the invention what is claimed as new and desired to be protected by Letters Patent is:—

1. The method of purifying sewage which resides in causing a flow thereof through a plurality of connected oxidation vessels, maintaining the liquid within said vessels under agitation, withdrawing liquid from the upper portion of each vessel and discharging the same through the bottom portion thereof under circulation in excess of the normal flow of liquid into and out of the said vessels, admitting air into the liquid as withdrawn from said vessels and finally delivering the liquid from the last of said vessels into a sludge thickening vessel.

2. The method of purifying sewage which comprises causing a flow thereof through a plurality of connected oxidation vessels, maintaining the liquid within said vessels under agitation, withdrawing liquid under suction from the upper portion of each vessel and returning the same thereto under pressure through the bottom portion of said vessels under a circulation in excess of the normal flow of liquid into and out of said vessels, admitting air into the suction flow of the liquid as withdrawn, delivering the treated liquid from the last of said vessels into a sludge thickening vessel, withdrawing and forcing said sludge into a sludge aerating vessel and admitting air into the flowing stream of sludge and finally leading the aerated sludge to the first of the oxidation vessels for intermixing with the sewage liquid therein.

3. The method of purifying sewage, the same comprising the causing of a flow of the liquid to be treated through a plurality of connected oxidation vessels, causing a rapid circulation of the liquid between the top and bottom portions of the vessels through a passage exterior thereto and in excess of the normal flow of liquid into and out of said vessels, simultaneously with said circulation oxidizing the liquid by admitting air to the flowing stream outside of the vessels, discharging liquid from the last of said vessels to within a sedimentation vessel, withdrawing the sludge from said vessel and forcing the same into a sludge aerating vessel and simultaneously admitting air to the flowing stream of sludge.

4. The method of purifying sewage, the same comprising the causing of a flow of the liquid to be treated through a plurality of connected oxidation vessels, causing a circulation of liquid from the top portion to the bottom portion of the vessels through a passage exterior thereto and in excess of the normal flow of liquid into and out of said vessels, simultaneously with said circulation oxidizing the liquid by admitting air to the flowing stream outside of the vessels, discharging liquid from the last of said vessels to within a sedimentation vessel, withdrawing the sludge from said vessel and forcing the same into a sludge aerating vessel, simultaneously admitting air to the flowing stream of sludge, and maintaining the liquid within the oxidation vessels and the sludge within the aeration vessel under agitation.

5. The method of purifying sewage which consists in maintaining a uniform flow of liquid into and out of a plurality of connected oxidation vessels, causing a rapid circulation of the liquid between the upper and bottom portions of the vessels by a withdrawal of the same to the exterior thereof and at a rate of travel in excess of the normal flow of liquid into and out of said vessels, simultaneously oxidizing the rapid circulating stream in one portion of its path of travel, delivering the liquor from the last oxidation vessel into a sedimentation vessel and maintaining the same comparatively still therein for the settlement of the solid contained therein, permitting the clear liquid to overflow from said vessel, withdrawing the thickened sludge therefrom and discharging the same into a sludge aerating vessel, simultaneously oxidizing the withdrawn sludge and finally discharging the aerated sludge into the first oxidation vessels.

6. The method of oxidizing sewage to be purified while continuously flowing through a plurality of connected oxidation vessels, the same comprising the withdrawing from the upper section of each vessel to the exterior thereof a portion of the liquid contained therein and returning the same under a rapid speed of travel to the said vessels adjacent the bottom section thereof, and simultaneously with the withdrawal of the liquid admitting air thereto for oxidation.

In testimony whereof I have signed my name to this specification.

LAMARTINE C. TRENT.